(12) United States Patent
Meneghini et al.

(10) Patent No.: US 7,406,509 B2
(45) Date of Patent: Jul. 29, 2008

(54) DYNAMIC SWITCHING OF A COMMUNICATION PORT IN A STORAGE SYSTEM BETWEEN TARGET AND INITIATOR MODES

(75) Inventors: John A. Meneghini, Billerica, MA (US); Arthur F. Lent, Cambridge, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 790 days.

(21) Appl. No.: 10/753,618

(22) Filed: Jan. 7, 2004

(65) Prior Publication Data

US 2005/0188060 A1 Aug. 25, 2005

(51) Int. Cl.
*G06F 15/16* (2006.01)
(52) U.S. Cl. .......... 709/217; 709/202; 709/212; 709/222; 709/230; 369/30.24; 369/30.26; 369/44.27; 707/10
(58) Field of Classification Search .......... 709/202, 709/212, 217, 222, 230; 707/10; 369/30.24, 369/30.26, 44.27
See application file for complete search history.

(56) References Cited

U.S. PATENT DOCUMENTS

| 5,694,586 | A | * | 12/1997 | Eneboe | 713/401 |
|---|---|---|---|---|---|
| 5,758,081 | A | * | 5/1998 | Aytac | 709/212 |
| 6,138,161 | A | * | 10/2000 | Reynolds et al. | 709/227 |
| 6,425,034 | B1 | | 7/2002 | Steinmetz et al. | |
| 6,470,397 | B1 | * | 10/2002 | Shah et al. | 709/250 |
| 6,957,351 | B2 | * | 10/2005 | Emberty et al. | 713/300 |
| 7,100,124 | B2 | * | 8/2006 | Cooke et al. | 716/1 |
| 7,130,900 | B2 | * | 10/2006 | Shiga et al. | 709/223 |
| 7,194,538 | B1 | * | 3/2007 | Rabe et al. | 709/224 |
| 2002/0091979 | A1 | * | 7/2002 | Cooke et al. | 714/733 |
| 2002/0124124 | A1 | | 9/2002 | Matsumoto et al. | |
| 2003/0225735 | A1 | * | 12/2003 | Weber | 707/1 |
| 2004/0030766 | A1 | * | 2/2004 | Witkowski | 709/223 |
| 2006/0230369 | A1 | * | 10/2006 | Cooke et al. | 716/4 |

* cited by examiner

*Primary Examiner*—Michael Won
(74) *Attorney, Agent, or Firm*—Blakely, Sokoloff, Taylor & Zafman LLP

(57) ABSTRACT

A storage system includes a communication port, the mode of operation of which can be dynamically switched by a user between a target mode and an initiator mode. The port may be a Fibre Channel port. The storage system may be a unified storage system operable to provide file-level access and block-level access to stored data.

10 Claims, 8 Drawing Sheets

DYNAMIC SWITCHING OF A COMMUNICATION PORT IN A STORAGE SYSTEM BETWEEN TARGET AND INITIATOR MODES

FIELD OF THE INVENTION

At least one embodiment of the present invention pertains to networked data storage systems, and more particularly, to a technique for dynamically switching the mode of a Fibre Channel port in a networked storage system between target mode and initiator mode.

BACKGROUND

A file server is a network-connected processing system that stores and manages shared files in a set of mass storage devices, such as disk drives, on behalf of one or more clients. Filer servers are used in many different applications, such as in data backup and recovery applications. Disks within a file system may be organized as one or more groups of Redundant Array of Independent/Inexpensive Disks (RAID).

One configuration in which file servers can be used is a network attached storage (NAS) configuration. In a NAS configuration, a file server can be implemented in the form of an appliance that attaches to a network, such as a local area network (LAN), a corporate intranet, or the Internet. An example of such an appliance is any of the Filer products made by Network Appliance, Inc. in Sunnyvale, Calif.

Another specialized type of network is a storage area network (SAN). A SAN is a highly efficient network of interconnected, shared mass storage devices. Such devices are also made by Network Appliance, Inc. One difference between NAS and SAN is that in a SAN the head provides a remote host with block-level access to stored data, whereas in a NAS configuration, the head normally provides clients with file-level access to stored data.

In this context, a "head" means all of the electronics, firmware and/or software (the "intelligence") that is used to control access to a set of mass storage devices; a head does not include the mass storage devices themselves. In a file server, the head normally is where all of the "intelligence" of the file server resides. Note that a "head" in this context is not the same as, and is not to be confused with, the magnetic or optical head that is used to physically read or write data from or to the mass storage medium.

A simple example of a storage network configuration is illustrated in FIG. 1. A filer (file server) "head" 2 is coupled locally to a set of mass storage devices 4, and to a set of clients 1 through an interconnect 3. The filer head 2 receives various read and write requests from the clients 1 and accesses the mass storage devices 4 to service those requests. Each of the clients 1 may be, for example, a conventional personal computer (PC), workstation, or the like. The mass storage devices 4 may be, for example, conventional magnetic tapes or disks, optical disks such as CD-ROM or DVD based storage, magneto-optical (MO) storage, or any other type of non-volatile storage devices suitable for storing large quantities of data. The filer head 2 can be configured and monitored from a management station 5, either via a direct coupling or via the network 3.

In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be a Fibre Channel (FC) switching fabric which implements the Fibre Channel Protocol (FCP). FCP is the encapsulation for Small Computer System Interface (SCSI) over FC.

A device which connects to other devices via FC transport, such as the head 2 in FIG. 1 for example, generally includes an FC host bus adapter (hereinafter "FC adapter"). The FC adapter has one or more FC ports, to which the physical FC transport medium is connected. In accordance with FCP, an FC port operates as either a "target" or an "initiator". In the known prior art, whether a particular FC port operates as a target or an initiator is determined by the manufacturer of the FC adapter, at the factory. For example, at least one well-known FC adapter has a built-in nonvolatile random access memory (NVRAM), which stores a target/initiator mode flag that determines the adapter type. This flag is read during boot up to determine which driver gets attached to the port(s), to determine whether the port(s) of the FC adapter operate as target or initiator. However, this flag is set by the manufacturer and cannot be modified in the field.

In various situations, however, it would be desirable to have the ability to switch the role of an FC port from target to initiator or vice versa dynamically in the field. For example, certain Filers made by Network Appliance are capable of operating in a NAS mode or a SAN mode or both modes at the same time. In such a dual-use devices (also referred to as "unified" storage devices), it would be desirable to have the ability to dynamically change the operating mode of an FC port between target and initiator, to more fully take advantage of the versatility of the device.

SUMMARY OF THE INVENTION

The present invention includes a storage system which comprises a communication port having a mode of operation that can be dynamically switched between a target mode and an initiator mode, and a method for dynamically switching the mode of operation of the port in response to user input from a user of the storage system.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for dynamically switching the operational mode of a Fibre Channel (FC) port in a storage system between target mode and initiator mode are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Figure 1:
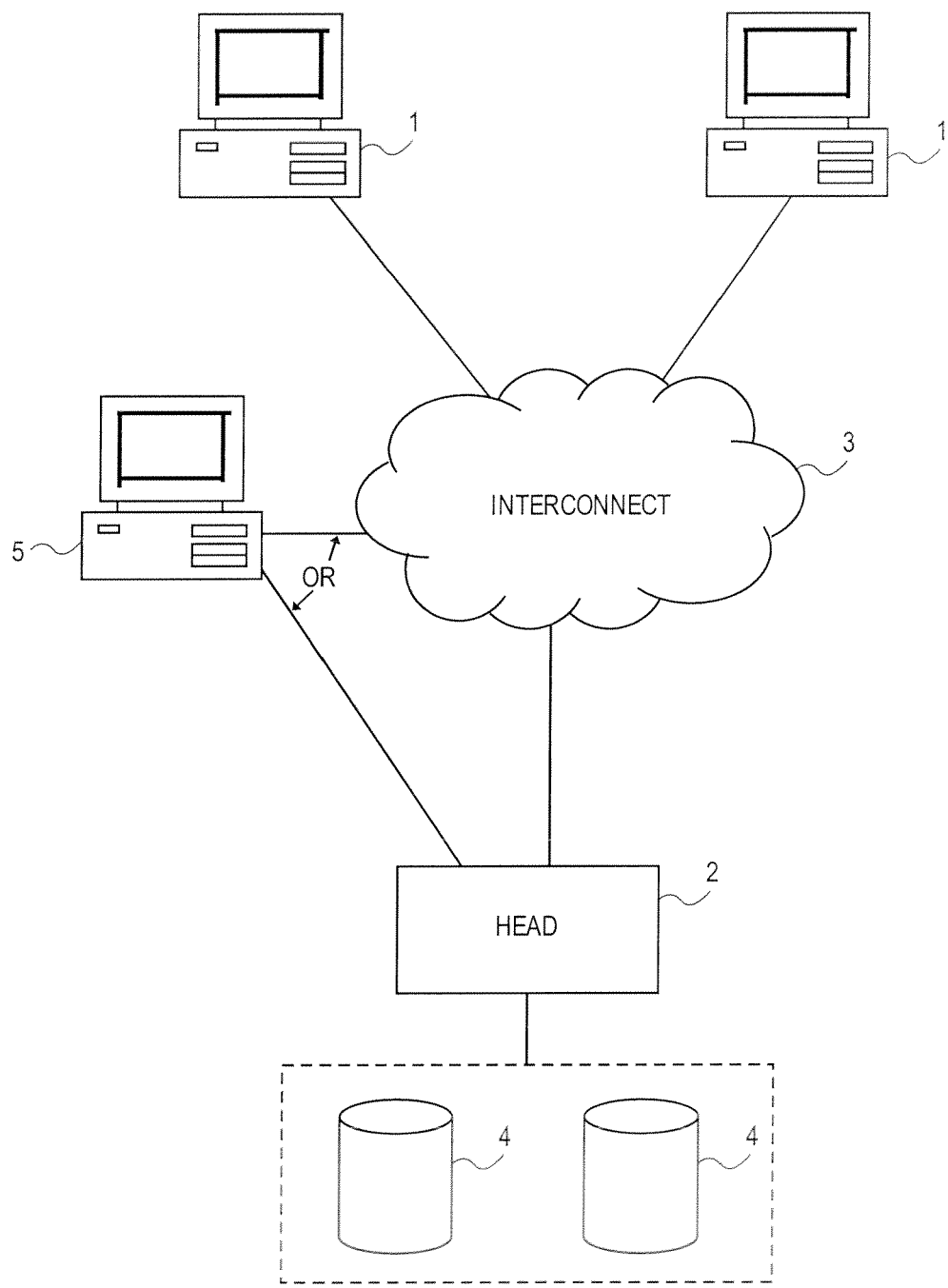
FIG. 1 illustrates an example of a storage network configuration.
Figure 2:
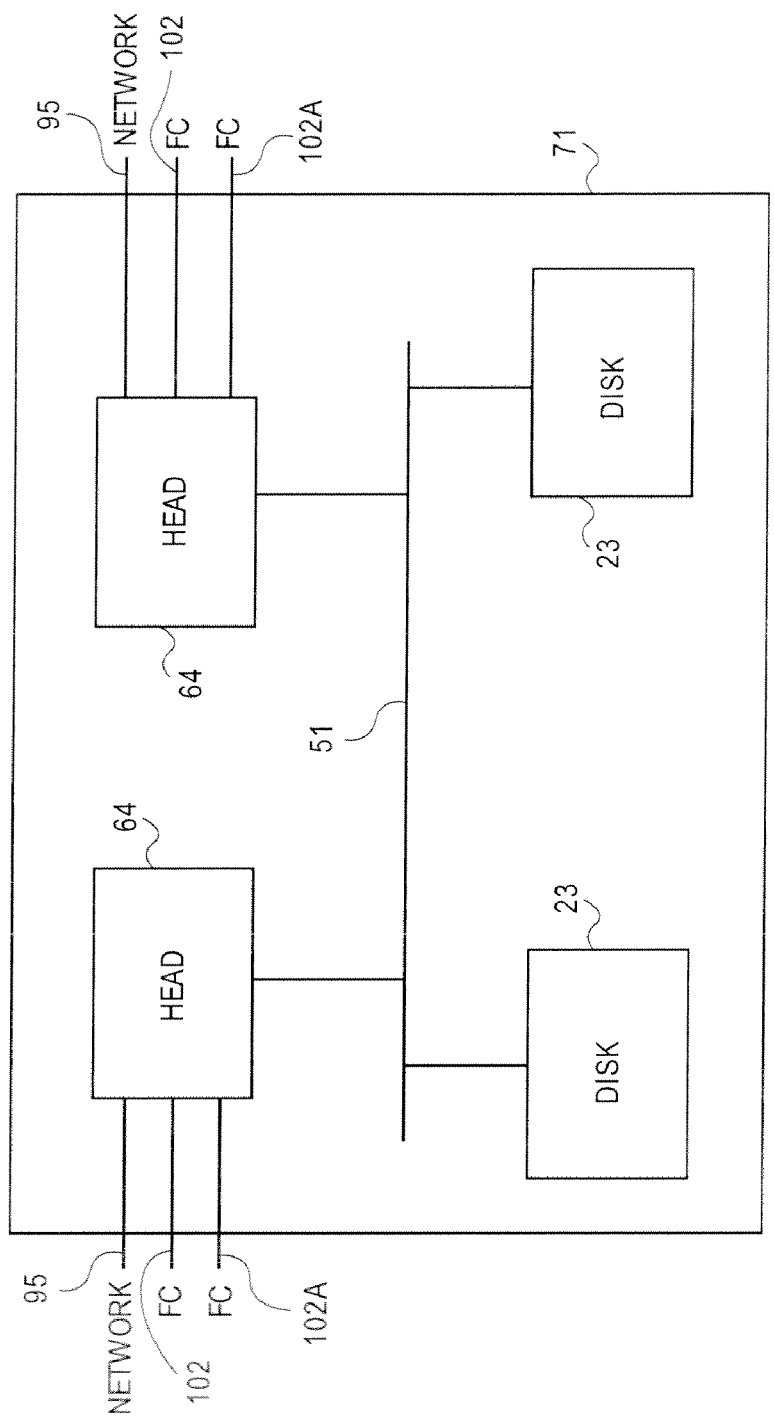
FIG. 2 is a high-level block diagram of a multiple-head stand-alone storage system.

FIG. 2 is a hardware layout block diagram of a storage system 71, which in certain embodiments can be dynamically configured (or reconfigured) to operate as either a NAS filer or a SAN device or both. All of the components of the storage system 71 are contained within a single chassis, so that the storage system 71 is capable of operating as a stand-alone file server. An example of a device with such capability is any of the FAS2xx series Storage Systems from Network Appliance. Note that this architecture is used here only as an example, to facilitate description. The techniques introduced herein are not limited in application to the architecture shown in FIG. 2.

In the illustrated embodiment, the major components of the system 71 are connected to, and communicate via, a passive backplane 51. The backplane 51 is "passive" in that it has no active electronic circuitry mounted on or in it; it is just a passive communications medium. For example, the backplane 51 can be essentially comprised of just one or more substantially planar substrate layers (which may be conductive or which may be dielectric with conductive traces disposed on/in it), with various pin-and-socket type connectors mounted on it to allow connection to other components inside the chassis.

Connected to the backplane 51 are a number of independent heads 64 and a number of internal hard disk drives 23. The heads 64 may be configured to operate as a clustered failover (CFO) pair, if desired. Not shown are various other components of the storage system 71 which are not germane to the present invention, such as one or more power supplies, input/output (I/O) modules, etc.

Each of the heads 64 has at least one network connection 95, such as an Ethernet connection, by which the heads 64 can communicate over a network with external devices, such as clients and/or a management station. In addition, each of the heads 64 has at least one external FC port 102 to connect the head 64 to external mass storage devices (e.g., disks) and another external FC port 102A, which can be used for various purposes as described below.

To facilitate description, it is generally assumed herein that each port 102A is used to implement SCSI commands over FC. However, the techniques described below are not limited to such an implementation. For example, the principles described herein can be easily adapted to dynamically reconfigure an Internet SCSI (iSCSI) port between target and initiator modes; to dynamically reconfigure a parallel SCSI port between target and initiator modes; to dynamically reconfigure a serial ATA port between target and initiator modes; or potentially to dynamically reconfigure any other type of data communication port between target and initiator modes.

The technique described below allows the external FC port 102A on each head 64 to be dynamically reconfigured as either an FC target or an FC initiator, in the field, while the storage system 71 is in operation. Of course, in various embodiments a storage system may have more than one port which is reconfigurable in this way. Among other advantages, the dynamic reconfigurability of FC port 102A enables users to more fully benefit from the dual NAS/SAN capability of the storage system 71, as further described now with reference to FIGS. 8 through 10.

Figure 8:
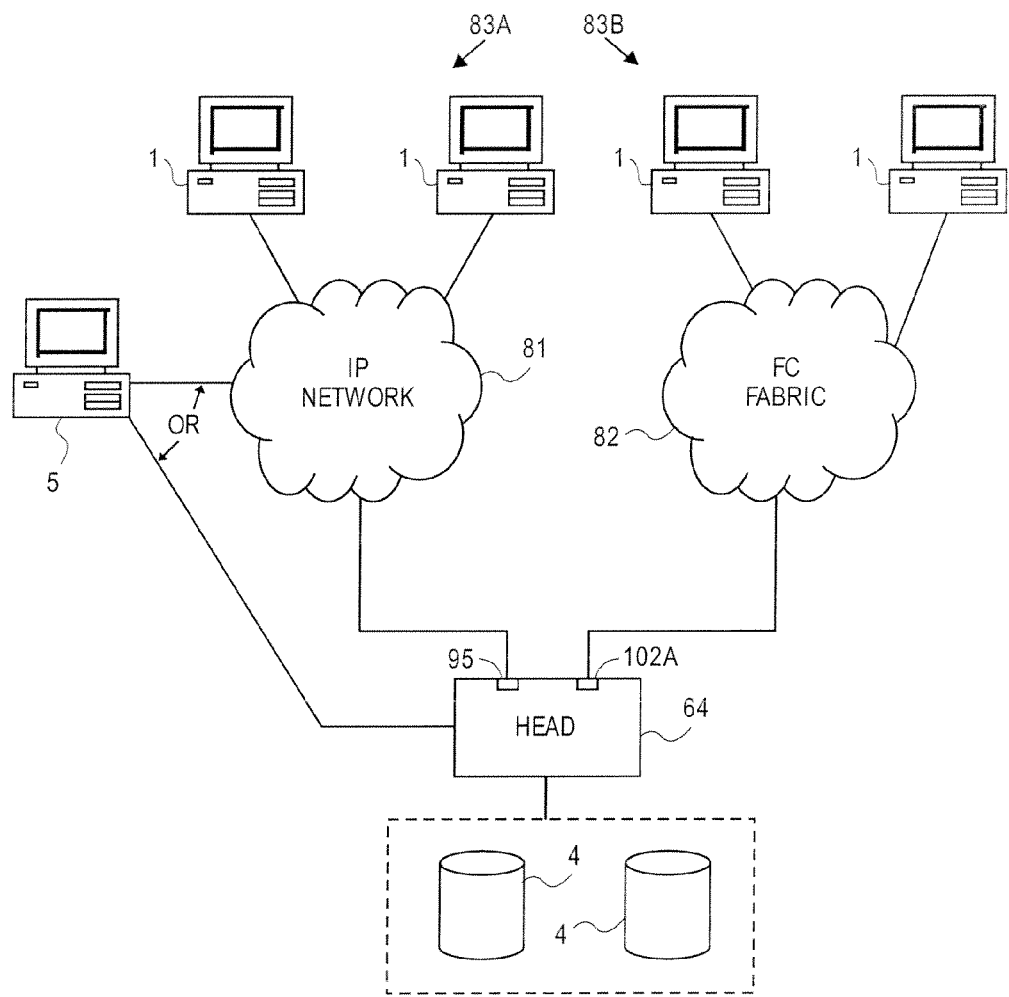
FIG. 8 illustrates a network configuration in which a Fibre Channel (FC) port on a head is used in the target mode to connect the head through an FC fabric to a set of clients.

When configured in the target mode, for example, the port 102A can be used to provide a head with a connection to a set of clients, separately from its standard network connection, as shown in FIG. 8. In FIG. 8, a head 64 in storage system 71 (only one head 64 is shown, to simplify the illustration) can be connected via its network connection 95 through a standard IP network to a first group of clients 83A, while it is connected via its FC port 102A through an FC fabric 82 to a second group of clients 83B. In this way, the head 64 may operate in a NAS mode to serve files to clients 83A while operating in a SAN mode to serve blocks to clients 83B.

Figure 9:
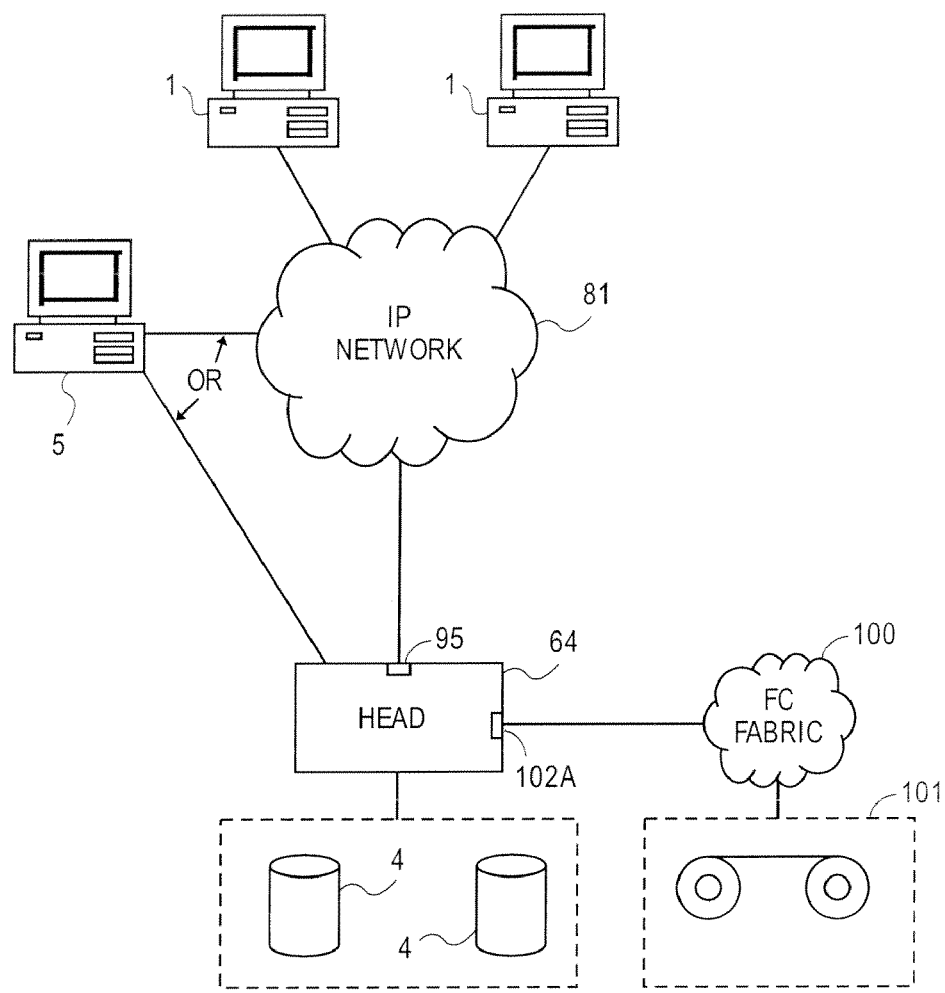
FIG. 9 illustrates a network configuration in which an FC port on a head is used in the initiator mode to connect the head to a SAN-based tape backup system.
Figure 10:
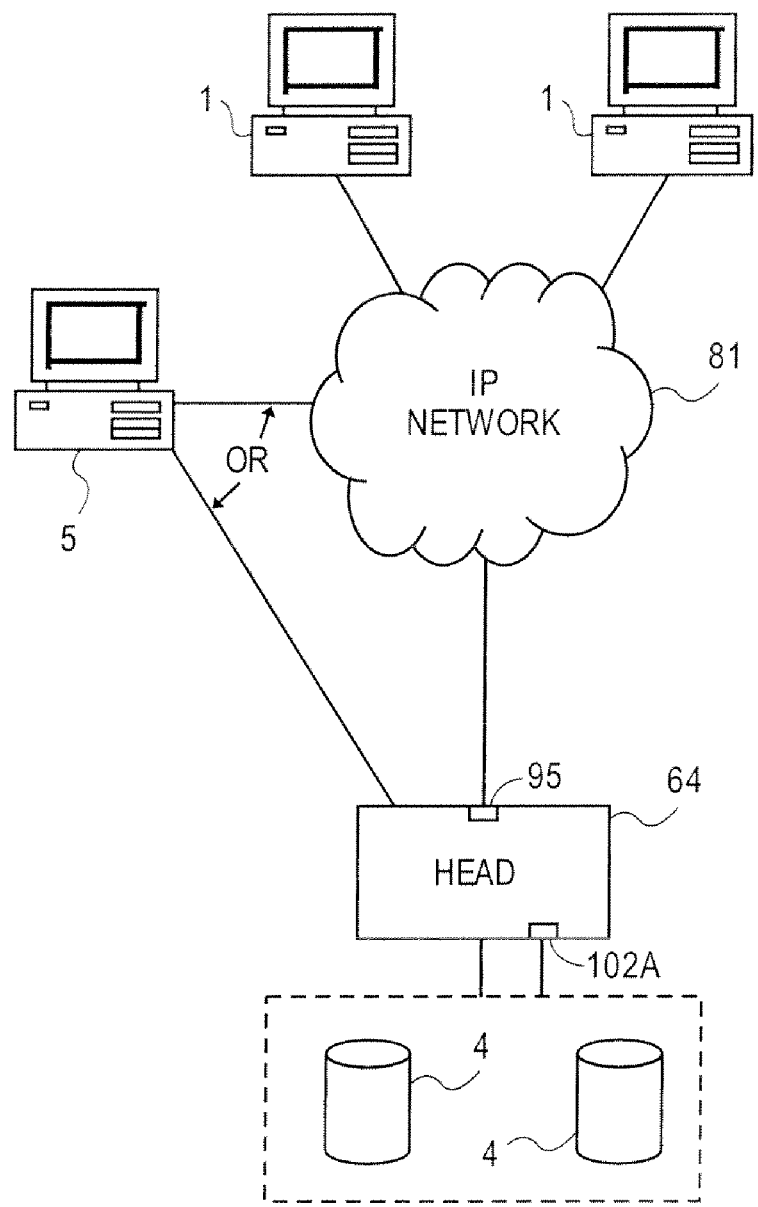
FIG. 10 illustrates a network configuration in which an FC port on a head is used in the initiator mode as an additional connection between the head and a set of disks.

Alternatively, the FC port 102A may be configured in the initiator mode. Among other applications, using FC port 102A in the initiator mode enables the head 64 to be connected via port 102A through an FC fabric 100 to a SAN-based tape backup system 101, separately from its connection to the disk drives 4, as shown in FIG. 9. Another possible use of the FC port 102A in the initiator mode is to provide the head 64 with an additional connection to the disks 4, to increase bandwidth and/or to provide connection redundancy to and from the disks 4.

In the known prior art, there is no way for a user to dynamically reconfigure an FC port from target to initiator or vice versa. Thus, in the known prior art, there is no easy way to take advantage of an available FC port to switch a dual NAS/SAN storage system, such as storage system 71, between various possible network configurations, such as those shown in FIGS. 8 through 10. The present invention, however, provides such capability.

Figure 3:
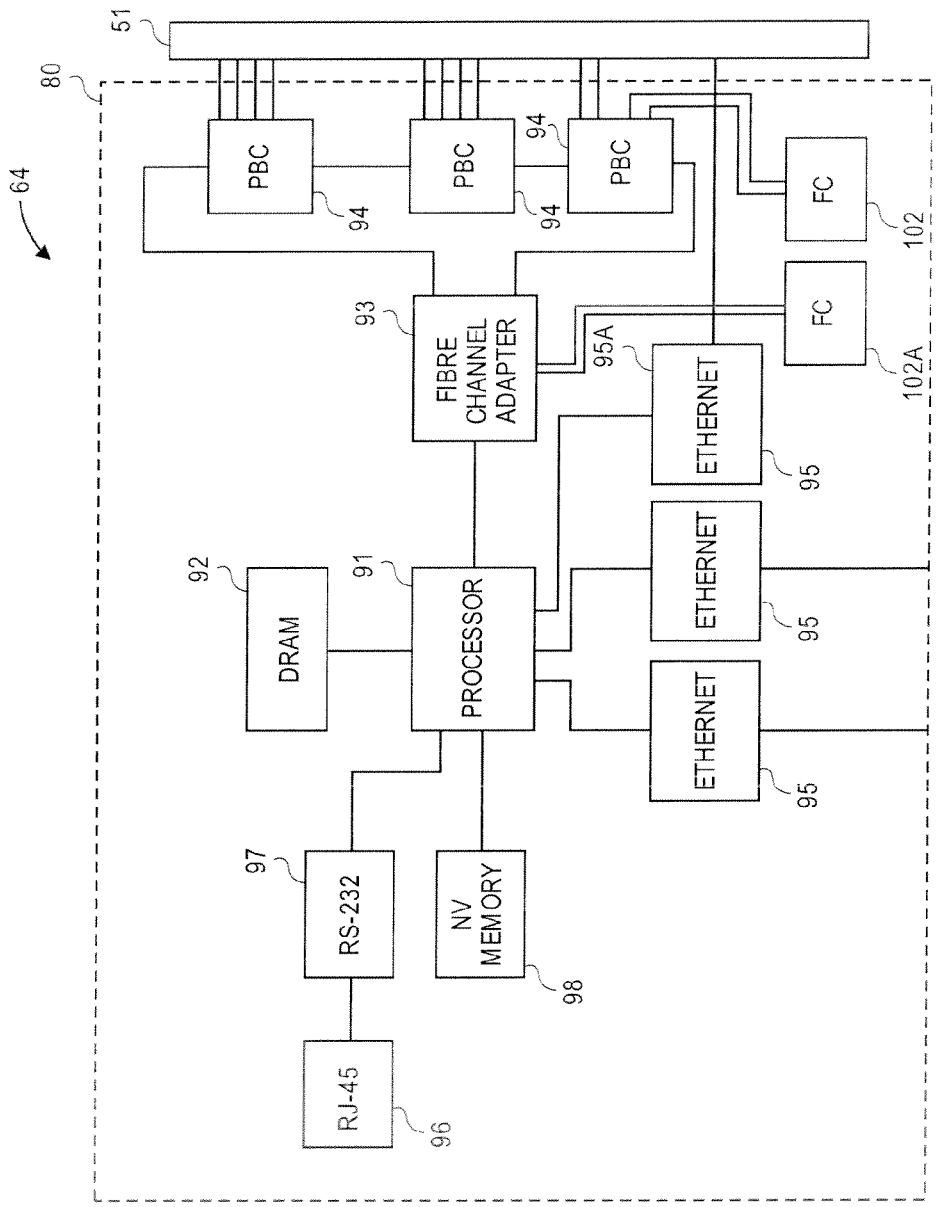
FIG. 3 is a block diagram of a single-board head for use in the storage system of FIG. 2.

FIG. 3 is a block diagram of a head 64, according to certain embodiments of the invention. In the illustrated embodiment, all of the components of the head 64 are implemented on a single circuit board 80. The head 64 includes a microprocessor 91, dynamic read-only memory (DRAM) 92 in the form of one or more dual inline memory modules (DIMMs), an integrated circuit FC adapter 93, a number of FC ports 102 and 102A, and a number of Fibre Channel IC port bypass circuits (PBCs) 94. The processor 91 controls the operation of the head 64. The DRAM 92 serves as the main memory of the head 64 and is used by the processor 91.

The PBCs 94 are connected to the processor 91 through the FC adapter 93 and can be connected to the passive backplane 51 through standard pin-and-socket type connectors (not shown) on the circuit board 80 and the backplane 51. The PBCs 94 are connected to the FC adapter 93 in a loop configuration. Each PBC 94 can communicate (through the backplane 51) separately with the internal disk drives 23 installed within the same chassis (see FIG. 2). Each PBC 94 provides loop resiliency relative to certain disk drives for which it is responsible, by bypassing a failed disk drive in the event of failure.

The head 64 also includes a number (three in the illustrated embodiment) of integrated circuit Ethernet adapters 95. In the illustrated embodiment, two of the Ethernet adapters 95 are coupled to external connectors to allow them to be connected to devices outside the chassis for network communication (e.g., to clients and/or a management station). The third Ethernet adapter 95A is connected only to the backplane 51 and is used only for head-to-head communication.

The head 64 further includes a standard RJ-45 connector 96 which is coupled to the processor 91 through a standard RS-232 transceiver 97. This connector-transceiver pair 96 and 97 allows a management station to be connected to the head 64, for purposes of remotely monitoring or configuring the head 64 or other administrative purposes.

The head 64 also includes at least one non-volatile memory 98 (e.g., Flash memory or the like). The non-volatile memory 98 stores information such as boot firmware, a boot image, test software and the like.

The head 64 further includes a number of FC ports 102 and 102A to allow connection of the head 64 to external components using FCP. One of the FC ports 102A is coupled directly to the FC adapter 93, while another FC port 102 is coupled to the FC adapter 93 through one of the PBCs 94.

Although the system 71 can operate as a standalone file server without any external disk drives, it may nonetheless be desirable in some situations to connect one or more external mass storage devices to the system 71. Accordingly, FC port 102A can be used (in initiator mode) to connect the head 64 to such external mass storage device(s). Alternatively, FC port 102A can be used for various other purposes, such as to connect the head 64 to a SAN-based tape backup system (in initiator mode) or to connect the head 64 to a set of clients (in target mode).

As noted above, in certain embodiments the processor 91 is programmed (by instructions and data stored in memory 92 and/or in memory 98) so that the head 46 is simultaneously operable as both a NAS filer (using file-level accesses to stored data) and a SAN storage system (using block-level accesses to stored data), i.e., to operate as a "unified" storage device, sometimes referred to as fabric attached storage (FAS) device. In other embodiments, the head 64 may be programmed so that the enclosure is operable as either a NAS file server or a SAN storage device, but not at the same time, where the mode of operation can be determined after deployment according to a selection by a user (e.g., a network administrator).

To facilitate this versatility of the storage system 71, the external FC port 102A can be dynamically configured to operate in either FCP target mode or FCP initiator mode, as desired. Users of the storage system 71 who acquire an FCP license will generally want the external FC port 102A to operate in FCP target mode, whereas users who do not may want the port 102A to operate in the FCP initiator mode, such as to support SAN enabled backups. This dynamic switching capability is made possible, in part, by creating a Boolean variable, FCP-TARGET-MODE, which is stored in the non-volatile memory 98 of the head 64. Note this variable is not stored in NVRAM within the FC adapter 93 (if any). The FC adapter 93 may include its own internal NVRAM, which may store a target/initiator mode flag set by the manufacturer; however, any such flag set by the manufacturer is ignored according to the techniques introduced herein.

By changing the state of FCP-TARGET-MODE, the operational mode of FC port 102A is switched from target mode to initiator mode or vice versa. The state of this variable is dependent upon whether or not FCP has been licensed for use with the storage system 71. To configure port 102A in the target mode, the user of the storage system 71 licenses FCP and reboots the storage system 71. Once configured in the target mode, the user can reconfigure port 102A for initiator mode by unlicensing FCP and rebooting the storage system 71. The licensing or unlicensing of FCP (and other user actions for controlling the storage system 71) can be accomplished by applying appropriate user input at a management station, for example, using a user interface generated by the storage system 71.

Figures 4, 5:
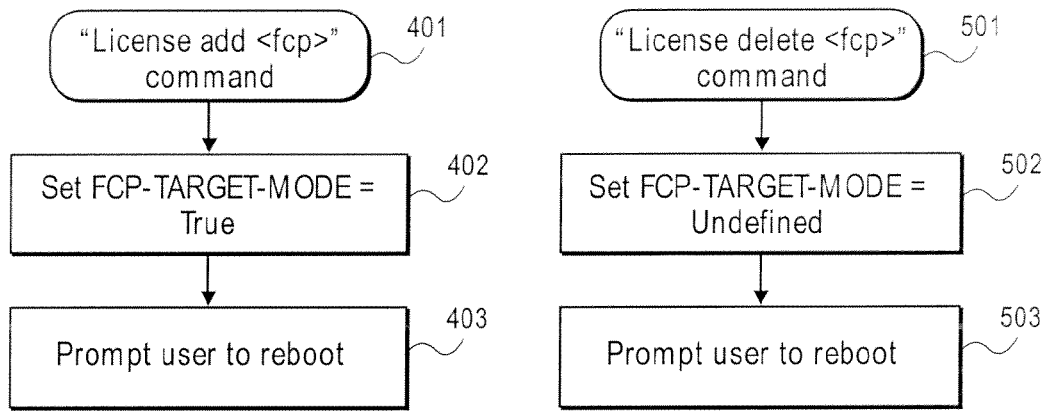
FIG. 4 illustrates a process flow in response to a "License add <fcp>" command.
FIG. 5 illustrates a process flow in response to a "License delete fcp" command.
Figure 6:
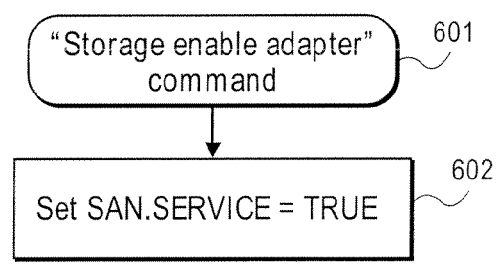
FIG. 6 illustrates a process flow in response to a "Storage enable adapter" command.

The technique for dynamically reconfiguring port 102A will now be described in further detail with reference to FIGS. 4 through 7. Referring now to FIG. 4, FCP is licensed by the user's inputting the command "License add <fcp>" at block 401 to a user interface of the storage system 71, where the parameter <fcp> represents the license key. This command causes FCP-TARGET-MODE to be set to True at block 403, after which the user is prompted at block 403 to reboot the system 71 to enable FCP service.

Referring now to FIG. 5, FCP can be unlicensed by the user's inputting the command "License delete fcp" to the storage system 71 at block 501. This command causes FCP-TARGET-MODE to be set to False at block 502, after which the user is prompted at block 503 to reboot the system 71 to enable FCP initiator mode.

In certain embodiments, during the first boot up after the system 71 has been deployed, it is necessary to put port 102A online to enable initiator mode operation. Accordingly, referring to FIG. 6, this is done by the user's inputting the command "Storage enable adapter" at block 601, which causes a Boolean variable called SAN.SERVICE to be set to True at block 602. The use of the aforementioned variables is further described with reference to FIG. 7.

Figure 7:
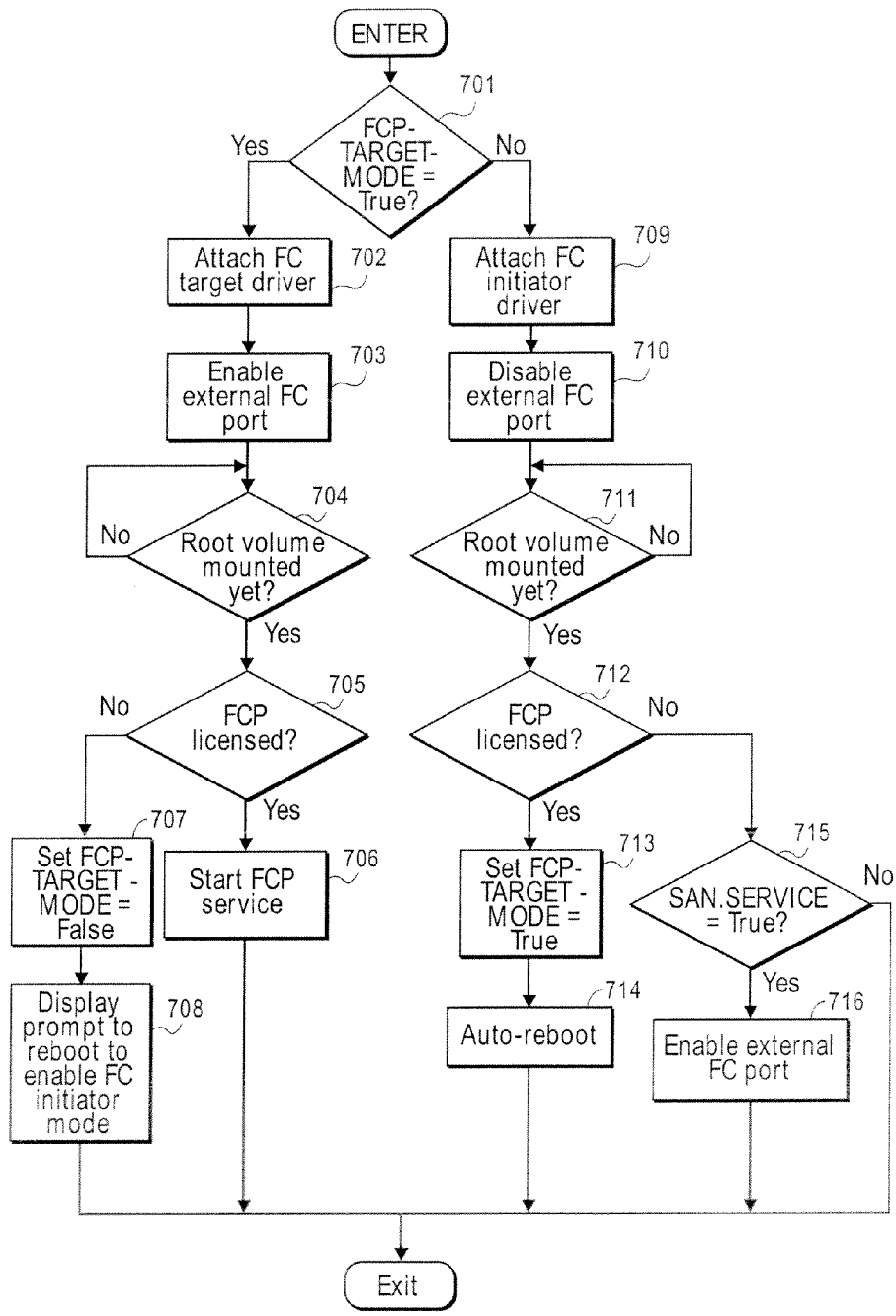
FIG. 7 illustrates a portion of the boot process of a head of a storage system for dynamic configuration of FC port mode.

FIG. 7 illustrates the relevant portion of the boot process of a head 64 in storage system 71, according to certain embodiments of the invention, for dynamic configuration of the FC port mode. Initially, the process checks the status of FCP-TARGET-MODE at block 701. If FCP-TARGET-MODE is set to True, then the following operations are performed: First, at block 702 the process attaches (selects for use) the FC target driver (software) to port 102A. It can be assumed that an appropriate FC target driver and an appropriate FC initiator driver are both available in local storage on the head 64 for use as needed, e.g., included as part of the operating system of the head 64. Note that in other embodiments, however, both the initiator functionality and the target functionality may be provided in a single driver, where the appropriate functionality of the driver is invoked according to whether target mode or initiator mode is desired.

After block 702, the process enables port 102A at block 703 and then waits until the root volume (i.e., the file system) of the head 64 has been mounted at block 704. After the root volume has been mounted, the process determines at block 705 whether FCP is currently licensed for use with storage system 71. If FCP is licensed, then the process starts FCP service at block 706. If FCP is not licensed, then the process sets FCP-TARGET-MODE to False at block 707 and generates a prompt to the user to reboot the system to enable the initiator mode at block 708.

Referring again to block 701, if FCP-TARGET-MODE is not set to True, then the following operations are performed: First, at block 709 the process attaches the FC initiator driver to port 102A. Next, the process disables port 102A at block 710 and then waits until the root volume of the head 64 has been mounted at block 711. After the root volume has been mounted, the process determines at block 712 whether FCP is licensed for use with storage system 71. If FCP is licensed, then the process sets FCP-TARGET-MODE to True at block 713 and initiates an automatic reboot at block 714. If FCP is not licensed, then the process determines whether SAN.SERVICE is True at block 715. If SAN.SERVICE is True, then the process enables port 102A at block 716; otherwise, the process ends at block 715.

Thus, a method and apparatus for dynamically switching the mode of a Fibre Channel port in a storage system between target mode and initiator mode have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    operating a storage system that includes a communication port, the port having a mode of operation, wherein the storage system is operable to provide a host with access to a set of mass storage devices by using the port, and to provide a plurality of hosts with file-level access and block-level access to stored data; and
    configuring the storage system from a first network configuration to a second network configuration or vice versa by dynamically switching the mode of operation of the port between a target mode and an initiator mode in response to user input from a user of the storage system, wherein in the first network configuration, the port is configured in the target mode and the storage system is connected through the port via a switching fabric to a set of clients to provide the set of clients with block-level access to a set of mass storage devices, and wherein in the second network configuration, the port is configured in the initiator mode.

2. A method as recited in claim 1, wherein the port is a Fibre Channel port.

3. A method as recited in claim 1, wherein the port is an iSCSI port.

4. A method as recited in claim 1, wherein operating the storage system comprises storing a variable within the storage system; and
    dynamically switching the mode of operation of the port comprises:
    changing a state of the variable based on user input; and
    reconfiguring the port to operate in either the target mode or the initiator mode based on the state of the variable.

5. A method as recited in claim 4, wherein the state of the variable is based on whether a right to use a particular protocol is associated with the storage system.

6. A method as recited in claim 5, wherein the protocol is a Fibre Channel Protocol (FCP).

7. A method as recited in claim 1, wherein dynamically switching the mode of operation of the port comprises:
    selecting one of a target driver and an initiator driver for the port based on a state of the variable.

8. A method as recited in claim 1, wherein in the second network configuration, the storage system is connected through the port to a SAN-based backup mass storage medium.

9. A method as recited in claim 1, wherein in the second network configuration the port is one of a plurality of ports used to connect the storage system to a set of mass storage devices.

10. A storage system, comprising:
    a communication port, the port having a mode of operation, and being operable to provide a host with access to a set of mass storage devices by using the port, and to provide a plurality of hosts with file-level access and block-level access to stored data; and
    a controller to dynamically switch the mode of operation of the port between a target mode and an initiator mode in response to user input from a user of the storage system such that the storage system is configured from a first network configuration to a second network configuration or vice versa, wherein in the first network configuration, the port is configured in the target mode and the storage system is connected through the port via a switching fabric to a set of clients to provide the set of clients with block-level access to a set of mass storage devices, and wherein in the second network configuration, the port is configured in the initiator mode.

* * * * *